United States Patent

Okazaki et al.

[11] 3,793,196
[45] Feb. 19, 1974

[54] SOFTENING AGENT
[75] Inventors: Norikazu Okazaki, Chiba; Akio Miyamura, Narashino, both of Japan
[73] Assignee: Lion Fat & Oil Co. Ltd., Tokyo, Japan
[22] Filed: Apr. 13, 1972
[21] Appl. No.: 239,081

[30] Foreign Application Priority Data
Mar. 31, 1971 Japan.............................. 46-19967

[52] U.S. Cl... 252/8.8, 117/139.5 CQ, 117/139.5 F, 252/8.6
[51] Int. Cl............................................. D06m 13/46
[58] Field of Search .... 252/8.8, 8.75, 547, DIG. 13; 117/139.5 CQ, 139.5 F

[56] References Cited
UNITED STATES PATENTS

| | | | |
|---|---|---|---|
| 3,578,591 | 5/1971 | Lazaridis et al. ............... | 252/8.75 X |
| 3,364,142 | 1/1968 | Buck.................................... | 252/8.8 |
| 3,681,241 | 8/1972 | Rudy................................... | 252/8.8 X |
| 3,010,849 | 11/1961 | Lense................................ | 117/139.5 |
| 3,349,033 | 10/1967 | Zuccarelli......................... | 252/8.75 |
| 2,461,043 | 2/1949 | Eisen ................................ | 117/139.5 |

Primary Examiner—Herbert B. Guynn
Attorney, Agent, or Firm—Woodhams, Blanchard & Flynn

[57] ABSTRACT

A softening agent capable of imparting softness, which comprises quaternary ammonium salt to be expressed by the following general formula

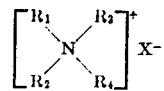

(wherein $R_1$, $R_2$, $R_3$ and $R_4$ represent any of alkyl radical, hydroxyalkyl radical and benzyl radical, and X represents halogen atom)

and higher alcohol, together with 0.5 to 5.0 wt % of sorbitan fatty acid ester and 0.3 to 6.0 wt % of polyoxyethylene alkyl or alkenyl ether.

2 Claims, 2 Drawing Figures

SOFTENING AGENT

BACKGROUND OF THE INVENTION a. Field of the Invention

The present invention relates to a softening agent which manifests an excellent softening effect for fiber or hair and also is stable in quality when placed on the market. More particularly, it relates to a stable emulsion for use in soft finishing, which is free from change in the viscosity prescribed to keep up the commercial value thereof and from giving rise to separation with the lapse of time.

b. Description of the Prior Art

As the softening agent for fiber or hair, a cationic surface active agent or a higher alcohol is effective, and an emulsion combining these two substances manifests a further superior effect. This emulsion, however, is undesirable from a commercial point of view as it is apt to give rise to change in viscosity, resulting in gelation or lowering of viscosity and, in its turn, separation. The adjustment and stabilization of the viscosity of such an emulsion has heretofore been effected by adding thereto some inorganic salt such as sodium chloride, potassium chloride, etc. or some lower alcohol such as ethanol, isopropanol, etc. or some polyhydric alcohol, such as ethylene glycol, glycerin, etc. But, although addition of these inorganic salts or solvents is effective in adjusting and stabilizing the viscosity to some degree, they are apt to deteriorate the emulsion stability and stability on the freeze-thaw cycle test, and are very likely to bring about the change in viscosity, gelation, separation and so forth with the lapse of time. Especially the latter method wherein the solvent is added for said purpose requires a considerable quantity of solvent compared with the higher alcohol constituting the emulsifying substance, and this influences the emulsion stability and makes the emulsion rather transparent in appearance, resulting in impairment of its commercial value.

SUMMARY OF THE INVENTION

The primary object of the present invention is to provide a softening agent which is capable of demonstrating an excellent softening effect for fiber or hair. Another object of the present invention is to provide a softening agent which is capable of retaining the emulsion stability and stability on the freeze-thaw cycle test on long standing.

The present invention relates to a softening agent which is composed of an O/W-type emulsion consisting of a cationic surface active agent as the emulsifier and a higher alcohol constituting the oil phase along with a small quantity of sorbitan fatty acid ester and polyoxyethylene alkyl or alkenyl ether mixed therewith, and more particularly, it relates to a softening agent which comprises a quaternary ammonium salt to be expressed by the general formula

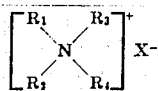

(wherein $R_1$, $R_2$, $R_3$ and $R_4$ represents any of alkyl radical having one to 20 carbon atoms, hydroxyalkyl radical having two to six carbon atoms and benzyl radical, providing that at least one of them represents alkyl radical having eight to 20 carbon atoms, and X represents halogen atom) and higher alcohol along with 0.3 to 5.0 wt% of sorbitan fatty acid ester and 0.3 to 6.0 wt% of polyoxyethylene alkyl or alkenyl ether.

BRIEF DESCRIPTION OF THE DRAWING

In the accompanying drawings.

DETAILED DESCRIPTION OF THE INVENTION

Figure 1:
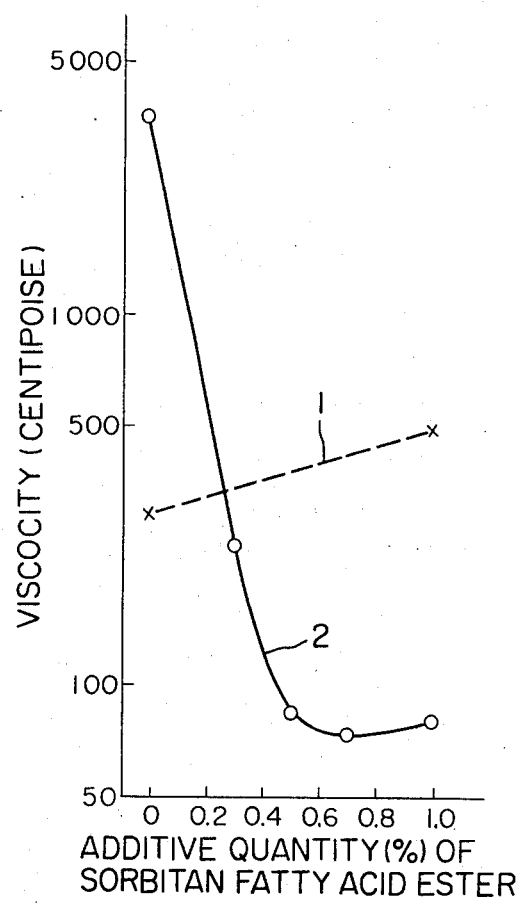
FIG. 1 is a graph showing changes in the viscosity of a system composed of stearyldimethylbenzyl ammonium chloride and cetyl alcohol along with sorbitan fatty acid ester added thereto.

In case of a composition prepared by adding sorbitan fatty acid ester to a system composed of cationic surface active agent and higher alcohol, it is possible to attain a highly stable viscosity free from deterioration with the lapse of time by employing a small quantity of said ester. However, just a slight difference in its quantity applied leads to a radical variation of the viscosity so that it is not easy to attain a prescribed viscosity. Not only that, when said composition is of high viscosity, it is poor in restitutability when it is defrozen after freezing at a low temperature, so that the range of serviceable viscosity thereof is limited. We have discovered that this defect, however, can be corrected by further adding polyoxyethylene alkyl or alkenyl ether to sorbitan fatty acid ester and combining both. In other words, with the increase in the quantity of polyoxyethylene alkyl or alkenyl ether being added, the grade of the viscosity curve for sorbitan fatty acid ester becomes gentle and it becomes easy to adjust the viscosity of the softening agent as prescribed. On top of this advantage, the stability on freeze-thaw cycle test of the softening agent is improved and a high-viscosity emulsion can be realized, leading to a considerable enlargement of the applicable range of viscosity to permit a free choice thereof. From the viewpoint of practical use, the appropriate range of viscosity is usually from 50 centipoises to 5,000 centipoises.

The cationic surface active agent applicable to the present invention is the quaternary ammonium salt to be expressed by the aforesaid general formula, and its relative amount is in the range of 0.1 to 10.0 wt% — preferably in the range of 1.0 to 7.0 wt%. The higher alcohol for use in the present invention includes the saturated or unsaturated alcohols having 12 to 18 carbon atoms, and its relative amount is desired to be in the range of 0.5 to 20 wt% — preferably in the range of 1.0 to 10.0 wt%. The sorbitan fatty acid ester for use in the present invention can contain monoester or sesquiester. The fatty acid in said ester includes the saturated and unsaturated fatty cis having 12 to 18 carbon atoms, and its relative amount is in the range of 0.3 to 5.0 wt%. In case the relative amount of sorbitan fatty acid ester is less than 0.3 wt%, the stability on freeze-thaw cycle test tends to become insufficient, and in case it is more than 5.0 wt%, the emulsion stability tends to deteriorate.

The polyoxyethylene ether for use in the present invention includes the saturated (alkyl) and unsaturated (alkenyl) radicals having 12 to 18 carbon atoms on which ethylene oxide chain having one to eight mols is attached, and its appropriate relative amount is in the range of 0.3 to 6.0 wt% of the whole mixture.

In case of the softening agent according to the present invention, it is easy to provide it with a viscosity suitable for the intended use at will, and the viscosity thus provided holds stable over a long period of time.

Besides, addition of the coloring matters, perfumes, etc. in an appropriate quantity will never impair the efficiency of the present softening agent.

The effect of the present invention will be understood from the results of the following experiments as well as examples embodying the present invention.

DESCRIPTION OF THE PREFERRED EMBODIMENTS

In this context, % hereinafter signifies wt%.

Experiment 1.

The viscosity of the system composed of cationic surface active agent (namely, stearyldimethylbenzyl ammonium chloride; hereinafter referred to as SDBAC for short) and higher alcohol (namely, cetyl alcohol) immediately after the mixing of both substances and the changes of said viscosity with the lapse of time are shown in the following Table-1.

The viscosity immediately after the mixing could be adjusted to some degree through controlling the condition of mixing, but the thus provided viscosity changed with the lapse of time till it attained a certain balanced value. The quantity of the higher alcohol applied exerted an influence on the viscosity, but it was very difficult to minimize the change in viscosity with the lapse of time, that is, to stabilize the viscosity.

TABLE 1

| Mixing rate of cetyl alcohol (percent) | Viscosity (centipoise) | |
|---|---|---|
| | immediately after the preparation | when left standing for 6 months at room temperature |
| 1.0 | 4 | x |
| 2.5 | 49 | 2000 |
| 3.0 | 4400 | 6000 |
| 5.0 | 6900 | 14000 |

(Remarks) The relative amount of SDBAC was 3.0 percent; x denotes separation.

Experiment 2

Changes in the viscosity arising from the addition of sorbitan monostearate to the same system as in Experiment 1 (providing that the relative amount was 3.0 percent for SDBAC and 2.8 percent for cetyl alcohol) were measured. The result was as shown in FIG. 1. It is clear from this result that the addition of a small quantity of sorbitan fatty acid ester brings about a radical change in viscosity. The numeral reference 1 in FIG. 1 denotes the viscosity immediately after the mixing, and 2 denotes the viscosity subsequent to 6-month indoor preservation.

Experiment 3

Figure 2:
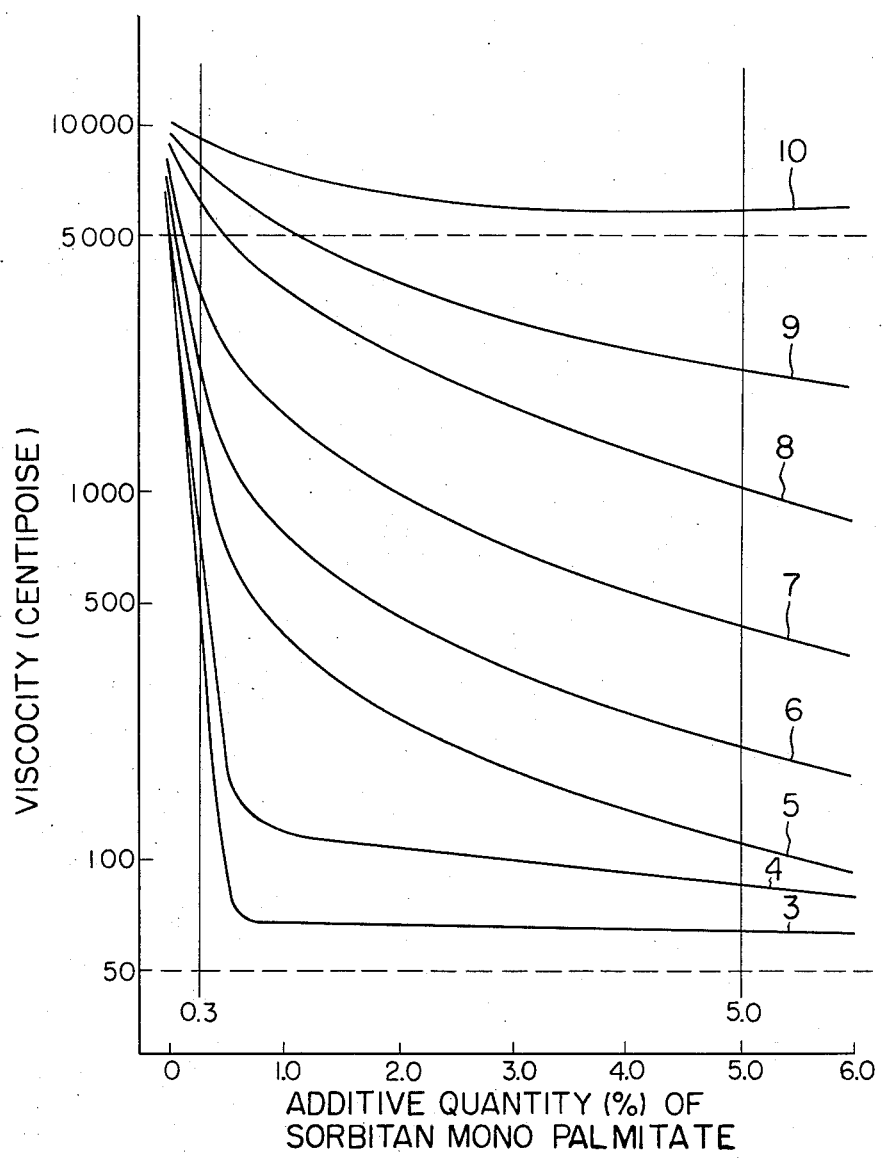
FIG. 2 is a graph showing the balanced viscosity of a system composed of stearyldimethylbenzyl ammonium chloride and cetyl alcohol along with sorbitan fatty acid ester and polyoxyethylene oleyl ether added thereto.

Changes in the viscosity arising from the addition of sorbitan monopalmitate and polyoxyethylene oleyl ether ($\bar{p}=5$) to the same system as in Experiment 1 (providing that the relative amount was 3.0 percent for SDBAC and 3.0 percent for cetyl alcohol) were measured. The result was as shown in FIG. 2. It is clear from this result that the change in viscosity of the softening agent containing sorbitan fatty acid ester becomes dull in proportion to the quantity of polyoxyethylene ether applied. In FIG. 2, the numeral reference 3 denotes non-addition, 4, 5, 6, 7, 8, 9 and 10 denote 0.5 percent, 1.0 percent, 2.0 percent, 3.0 percent, 4.0 percent, 5.0 percent and 6.0 percent respectively in terms of the quantity of polyoxyethylene oleyl ether ($\bar{p}=5$) added. On the other hand, for the purpose of showing the effect of the joint use of sorbitan fatty acid ester and polyoxyethylene ether, the results of measurement of the viscosity, stability on freeze-thaw cycle test and emulsion stability after 6-months indoor preservation are shown in Table-2.

TABLE 2

| Quantity of sorbitan monopalmitate added (%) | Viscosity after 6-month indoor preservation (centipoise) | Stability on freeze-thaw cycle test | Emulsion stability |
|---|---|---|---|
| 1 0 | 8500 | x | 0 |
| 0.2 | 2500 | x | 0 |
| 0.3 | 1500 | 0 | 0 |
| 0.5 | 700 | 0 | 0 |
| 1.6 | 400 | 0 | 0 |
| 3.0 | 170 | 0 | 0 |
| 5.0 | 110 | 0 | 0 |
| 6.0 | 90 | 0 | x |

(Remarks) Mixing rate: 3.0 percent for SDBAC; 3.0% for cetyl alcohol; 1.0 percent for polyoxyethylene oleyl ether; 0 signifies "satisfactory"; x signifies "separation."

EMBODIMENTS

In this context, % appearing in the following tabular exhibits signifies wt%.

EXAMPLE 1

| | (%) |
|---|---|
| stearyldimethylbenzyl ammonium chloride | 3.0 |
| cetyl alcohol | 3.0 |
| glycerin | 2.0 |
| sorbitan monopalmitate | 0.5 |
| polyoxyethylene oleyl ether ($\bar{p}=3$) | 0.5 |
| water | 92.0 |
| | 100.0 |

EXAMPLE 2

| | (%) |
|---|---|
| stearyldimethylbenzyl ammonium chloride | 3.0 |
| cetyl alcohol | 10.0 |
| glycerin | 3.0 |
| sorbitan monopalmitate | 2.5 |
| polyoxyethylene lauryl ether ($\bar{p}=2$) | 1.0 |
| water | 80.5 |
| | 100.0 |

EXAMPLE 3

| | (%) |
|---|---|
| distearyldimethyl ammonium chloride | 1.0 |
| cetyl alcohol | 4.0 |
| sorbitan sesquistearate | 1.5 |
| polyoxyethylene cetyl ether ($\bar{p}=4$) | 1.5 |
| ethylene glycol | 4.0 |
| water | 88.0 |
| | 100.0 |

EXAMPLE 4

| | (%) |
|---|---|
| stearyltrimethyl ammonium chloride | 3.0 |
| cetyl alcohol | 5.0 |
| glycerin | 2.0 |

EXAMPLE 4 -Continued

| | |
|---|---|
| sorbitan monostearate | 0.6 |
| polyoxyethylene oleyl ether ($\bar{p}=5$) | 0.6 |
| perfume, coloring matter | 0.3 |
| water | 88.5 |
| | 100.0 |

EXAMPLE 5

| | (%) |
|---|---|
| distearyldimethyl ammonium chloride | 5.0 |
| cetyl alcohol | 2.0 |
| sorbitan monostearate | 1.0 |
| polyoxyethylene oleyl ether ($\bar{p}=6$) | 1.0 |
| glycerin | 3.0 |
| perfume, coloring matter | 0.3 |
| water | 86.7 |
| | 100.0 |

The viscosity and the stability (in terms of stability on freeze-thaw cycle test and emulsion stability) of the softening agents composed as above were as shown in the following table 3 which verifies that the product under the present invention can serve as an excellent softening agent.

TABLE 3

| Example | Viscosity immediately after the preparation (centipoise) | Viscosity when left standing for 6-month at room temperature (centipoise) | Stability |
|---|---|---|---|
| 1 | 400 | 300 | o |
| 2 | 1000 | 850 | o |
| 3 | 600 | 450 | o |
| 4 | 1700 | 1500 | o |
| 5 | 2100 | 2000 | o |

(Remarks) o signifies that the agent concerned held stable for 6 months.

What is claimed is:

1. A softening agent which consists essentially of an aqueous solution of 0.1 to 10 percent by weight of quaternary ammonium salt of the formula

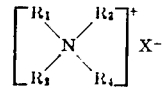

(wherein $R_1$, $R_2$, $R_3$ and $R_4$ are selected from the group consisting of alkyl radical having one to 20 carbon atoms, hydroxyalkyl radical having two to six carbon atoms and benzyl radical, provided that at least one of them is alkyl radical having eight to 20 carbon atoms, and X is halogen), 0.5 to 20 percent by weight of an unsubstituted saturated or unsaturated higher alcohol having 12 to 18 carbon atoms, 0.3 to 5.0 percent by weight of sorbitan fatty acid mono- or sesquiester of fatty acids having 12 to 18 carbon atoms and 0.3 to 6.0 percent by weight of polyoxyethylene alkyl or alkenyl ether containing from 1 to 8 mols of ethylene oxide and in which the alkyl or alkenyl contains 12 to 18 carbon atoms.

2. A softening agent as defined in claim 1, which contains an effective quantity of coloring matter or perfume or a mixture of these substances.

* * * * *